United States Patent
Williams et al.

(10) Patent No.: US 10,776,788 B2
(45) Date of Patent: Sep. 15, 2020

(54) SYSTEMS AND METHODS FOR IDENTIFYING COMPROMISED ACCOUNTS USING HISTORICAL AUTHORIZATION MESSAGES

(71) Applicant: MasterCard International Incorporated, Purchase, NY (US)

(72) Inventors: Kyle Williams, O'Fallon, MO (US); David J. Senci, Troy, IL (US); David Adams, Dubai (AE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 554 days.

(21) Appl. No.: 15/591,246

(22) Filed: May 10, 2017

(65) Prior Publication Data
US 2018/0330381 A1 Nov. 15, 2018

(51) Int. Cl.
| | |
|---|---|
| *G06Q 20/04* | (2012.01) |
| *G06Q 20/10* | (2012.01) |
| *G06Q 20/40* | (2012.01) |
| *H04L 29/06* | (2006.01) |
| *G06Q 20/34* | (2012.01) |
| *G06Q 20/38* | (2012.01) |

(52) U.S. Cl.
CPC ........ *G06Q 20/4016* (2013.01); *G06Q 20/34* (2013.01); *G06Q 20/382* (2013.01); *G06Q 20/40* (2013.01); *G06Q 20/401* (2013.01); *H04L 63/1416* (2013.01)

(58) Field of Classification Search
CPC ..... G06Q 20/04; G06Q 20/10; G06Q 20/4016
USPC ........................................................ 705/44
See application file for complete search history.

(56) References Cited

U.S. PATENT DOCUMENTS

| | | | |
|---|---|---|---|
| 6,783,065 B2 * | 8/2004 | Spitz | G06Q 20/10 235/376 |
| 7,580,891 B2 | 8/2009 | Klebanoff | |
| 7,739,169 B2 | 6/2010 | Hammad | |
| 7,761,379 B2 | 7/2010 | Zoldi et al. | |

(Continued)

OTHER PUBLICATIONS

PCT International Search Report and Written Opinion, Application No. PCT/US2018/030794, dated Jul. 25, 2018, 12 pps.

*Primary Examiner* — Clifford B Madamba
(74) *Attorney, Agent, or Firm* — Armstrong Teasdale LLP

(57) ABSTRACT

A computing network system including a historical authorization database, a lost and stolen card (LSC) database, an account data breach (ADB) database, and a compromised identification (CI) computing device is provided. The CI computing device retrieves a set of historical account identifiers associated with historical transactions of a candidate merchant from the historical authorization database. The CI computing device compares the historical account identifier to lost and/or stolen (LS) account data stored by the LSC database and breach data stored by the ADB database. The CI computing device generates a compromised account message when a historical account identifier has a matching account identifier within the LS account data and/or the breach data. The compromised account message includes the matching account identifier and an associated reason code indicating a cause of compromise. The CI computing device transmits the compromised account message to the candidate merchant for review and analysis.

23 Claims, 7 Drawing Sheets

(56) References Cited

U.S. PATENT DOCUMENTS

| | | | |
|---|---|---|---|
| 7,945,515 B2* | 5/2011 | Zoldi | G06Q 20/04 |
| | | | 705/44 |
| 8,612,340 B1 | 12/2013 | Yan | |
| 9,117,230 B2* | 8/2015 | Joao | G06Q 20/04 |
| 9,392,008 B1 | 7/2016 | Michel et al. | |
| 2010/0169192 A1 | 7/2010 | Zoldi et al. | |
| 2014/0279331 A1 | 9/2014 | Gimby et al. | |
| 2015/0073981 A1* | 3/2015 | Adjaoute | G06Q 20/4016 |
| | | | 705/39 |
| 2015/0095227 A1 | 4/2015 | Brozek et al. | |
| 2015/0339673 A1 | 11/2015 | Adjaoute | |
| 2016/0110709 A1 | 4/2016 | Lacoss-Arnold | |
| 2016/0217470 A1 | 7/2016 | Gerard et al. | |
| 2017/0024828 A1 | 1/2017 | Michel et al. | |

\* cited by examiner

SYSTEMS AND METHODS FOR IDENTIFYING COMPROMISED ACCOUNTS USING HISTORICAL AUTHORIZATION MESSAGES

BACKGROUND

The field of the present disclosure relates generally to identifying compromised payment accounts, and more specifically, to network-based systems and methods configured to identify compromised payment accounts using historical authorization messages.

Payment accounts and payment cards (e.g., debit cards, credit cards, etc.) may be subject to fraudulent activity, such as theft and data breaches. These compromised payment accounts may be used in fraudulent transactions with merchants to purchase goods and/or services at the expense of the cardholder. If a fraudulent transaction is contested (i.e., by the cardholder), liability of the fraudulent transaction is determined, and the liable party is responsible for reimbursing the legitimate cardholder for the fraudulent transaction. In some embodiments, the liable party may be a merchant associated with the fraudulent purchase.

In at least some known systems, to prevent fraudulent purchases, the merchant requests information about compromised accounts from issuing institutions (e.g., banks) and/or a payment processor that processes transactions via a payment network. The payment network is configured to facilitate communication between various parties associated with a payment transaction. However, these requests rely upon the merchant to request compromised account information for specific payment accounts. Moreover, the compromised account information may be stored in various, separate databases, which may increase the number of requests transmitted by the merchant, thereby potentially increasing the bandwidth and processing burden of the payment network. These requests also increase the processing demands on the merchant to identify compromised payment accounts, which may impact the merchant's bandwidth and processing time for other processes, such as processing the transactions.

BRIEF DESCRIPTION

In one aspect, a distributed computer network system includes a historical authorization database for storing a plurality of historical account identifiers associated with historical transactions, a lost and stolen card (LSC) database for storing lost and stolen (LS) account data, an account data breach (ADB) database for storing breach data, and a compromise identification (CI) computing device. The LS account data includes at least one account identifier and a respective reason code indicating a cause of lost or stolen account for each of the account identifiers of the LS account data. The breach data includes at least one account identifier and a respective reason code indicating a cause of data breach for each of the account identifiers of the breach data. The CI computing device includes a processor and a memory in communication with the processor. The processor is programmed to retrieve a set of historical account identifiers associated with a candidate merchant from the historical authorization database, compare the set of historical account identifiers to the account identifier(s) of the LS account data, compare the set of historical account identifiers to the account identifier(s) of the breach data, determine whether a first historical account identifier of the set of historical account identifiers matches one of the account identifiers of the LS account data or the breach data, generate a compromised account message when the first historical account identifier is determined to have a first matching account identifier within the LS account data and/or the breach data, and transmit the compromised account message to a candidate merchant. Each account identifier of the set of historical account identifiers is associated with a respective historical transaction of the candidate merchant. The compromised account message includes the first matching account identifier and a reason code associated with the first matching account identifier.

In another aspect, a method for providing a compromised account message to a candidate merchant is provided. The method is at least partially performed by a CI computing device. The method includes retrieving a set of historical account identifiers associated with a candidate merchant from a historical authorization database that stores a plurality of historical account identifiers associated with historical transactions, comparing the set of historical account identifiers to at least one account identifier of LS account data stored by an LSC database, comparing the set of historical account identifiers to at least one account identifier of breach data stored by an ADB database, determining whether a first historical account identifier of the set of historical account identifiers matches one of the at least one account identifiers of the LS account data or the breach data, generating a compromised account message when the first historical account identifier is determined to have a first matching account identifier within the LS account data and/or the breach data, and transmitting the compromised account message to the candidate merchant. Each account identifier of the set of historical account identifiers is associated with a respective historical transaction of the candidate merchant. The LS account data includes the account identifier(s) and a respective reason code indicating a cause of lost or stolen account for each of the account identifiers of the LS account data. The LS account data includes the account identifier(s) and a respective reason code indicating a cause of data breach for each of the account identifiers of the breach data. The compromised account message includes the first matching account identifier and a reason code associated with the first matching account identifier.

In yet another aspect, at least one non-transitory computer-readable storage media having computer-executable instructions embodied thereon is provided. When executed by at least one processor, the computer-executable instructions cause the processor to retrieve a set of historical account identifiers associated with a candidate merchant from a historical authorization database that stores a plurality of historical account identifiers associated with historical transactions, compare the set of historical account identifiers to at least one account identifier of LS account data stored by an LSC database, compare the set of historical account identifiers to at least one account identifier of breach data stored by an ADB database, determine whether a first historical account identifier of the set of historical account identifiers matches one of the account identifiers of the LS account data and/or the breach data, generate a compromised account message when the first historical account identifier is determined to have a first matching account identifier within the LS account data and/or the breach data, and transmit the compromised account message to the candidate merchant. Each account identifier of the set of historical account identifiers is associated with a respective historical transaction of the candidate merchant. The LS account data includes the account identifier(s) and a respective reason code indicating a cause of lost or stolen account for each of the account identifiers of the LS account data. The LS account data includes the account identifier(s) and a respective reason code indicating a cause of data breach for each of the account identifiers of the breach data. The compromised account message includes the first matching account identifier and a reason code associated with the first matching account identifier.

BRIEF DESCRIPTION OF THE DRAWINGS

FIG. 1 is a schematic diagram illustrating an example compromise identification (CI) system for identifying compromised payment accounts in accordance with one embodiment of the disclosure.

FIG. 2 is an example data flow diagram of the system shown in FIG. 1.

FIG. 3 is an example multi-party payment card processing system that may be used to provide authorization messages to the system shown in FIG. 1.

FIG. 4 is an expanded block diagram of an example embodiment of a remote device for use in the system shown in FIG. 1.

FIG. 5 illustrates an example configuration of a host system for use in the system shown in FIG. 1.

FIG. 6 is a flowchart of an example process for providing compromised account data to a merchant using the system shown in FIG. 1.

FIG. 7 is a diagram of components of one or more example computing devices that may be used in embodiments of the described systems and methods.

DETAILED DESCRIPTION

Figure 1:
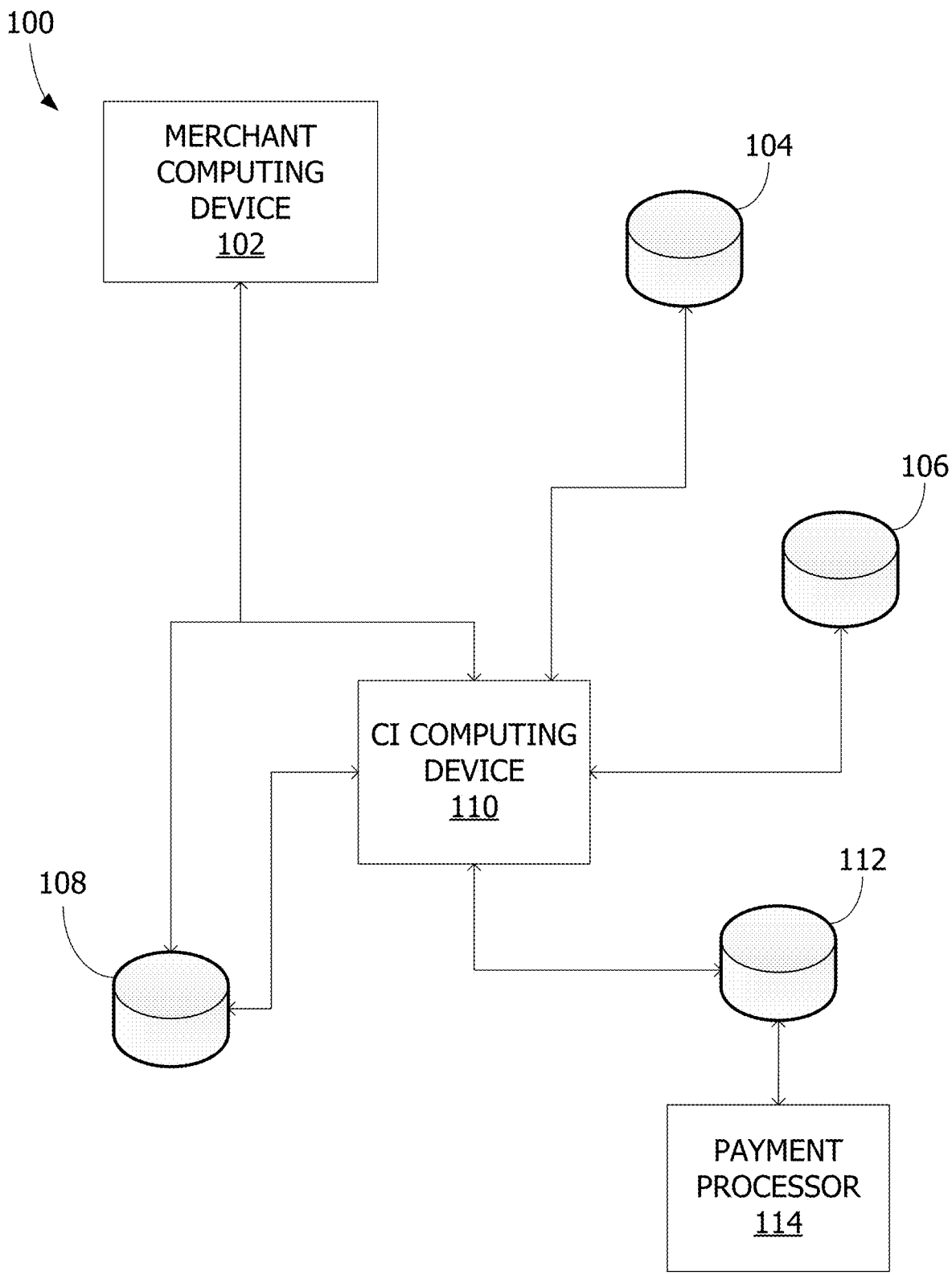
FIGS. 1-7 show example embodiments of the methods and systems described herein.

Systems and method according to this disclosure are directed to identifying compromised payment accounts, and more specifically, to network-based systems and methods configured to identify compromised payment accounts using historical authorization messages associated with merchants.

In the example embodiment, a compromise identification (CI) system is a distributed computer network system that includes a CI computing device. The CI computing device includes at least one processor and at least one memory device communicatively coupled to the processor. The memory device stores computer instructions that, when executed by the processor, cause the processor to function as described herein. The system further includes a lost and stolen card (LSC) database and an account data breach (ADB) database communicatively coupled to the CI computing device. The LSC database and the ADB database are separate from each other, and in at least some embodiments, the LSC and ADB databases are in communication with the CI computing device over different communication networks in a distributed architecture. The LSC and ADB databases are configured to store data associated with potentially compromised payment accounts. The potentially compromised payment accounts may be susceptible to an increased chance of fraud, such as payment accounts associated with lost or stolen payment cards, or payment accounts involved in data breaches. The data stored by the LSC and ADB databases includes, but is not limited to, an account identifier (e.g., a payment account number (PAN)) and a reason code indicating why the payment account has been identified as compromised, lost, and/or stolen for each stored payment account. In at least some embodiments, the data further includes a compromise timestamp, a potential origin of the compromise, and/or other information associated with the compromised account.

The LSC and ADB databases are further in communication with one or more issuers and/or other third parties, such as a processor administrator associated with a payment network. The issuers are banks or other financial institutions that provide payment accounts and payment cards to cardholders. The issuers and/or other parties submit data associated with the compromised payment accounts to the LSC and ADB databases to provide others issuers with the data. In some embodiments, the LSC database and/or the ADB database are communicatively coupled to a payment processor of a payment network, to receive the data. The payment network is a closed or private network (i.e., accessing the network requires permission from an administrator of the payment network) that has specific message protocols for transmitting and receiving messages associated with payment transactions. Various parties associated with these transactions, such as, but not limited to, merchants, banks, other financial institutions, and/or other third parties, access the payment network to process the transactions. The payment processor is configured to facilitate the communication between the parties and resolve the transactions by receiving, transmitting, and/or generating messages associated with the transactions. In the example embodiment, the LSC and ADB databases are communicatively coupled to the CI computing device via one or more communication networks separate from the payment network.

The LSC database is configured to store lost and stolen (LS) account data associated with lost or stolen payment cards. When a payment card is lost or stolen, the cardholder typically contacts an issuer associated with the payment card to report the payment card as missing. The cardholder may identify the payment card as lost or stolen. In certain embodiments, the cardholder may provide a timestamp that approximates when the cardholder believes the payment card went missing. In other embodiments, a timestamp corresponding to when the cardholder reported the payment card as missing or stolen may be generated. A provider of the payment card (e.g., a bank) generates LS account data for the account associated with the missing payment card and transmits the LS account data to the LSC database for storage. In the example embodiment, the LS account data includes an account identifier associated with the payment card, a reason code indicating a cause of compromise (e.g., lost or stolen), and a timestamp. The LSC database is configured to store LS account data for a plurality of payment cards. In at least some embodiments, the LSC database stores the LS account data for each payment card for a predetermined period of time. In one example, the LSC database stores the LS account data for two years. After two years, the LSC database removes the LS account data to facilitate increased storage capacity for new LS account data.

The ADB database is configured to store breach data associated with payment accounts potentially involved in data breaches (also known as "account data compromises") involving payment information. A data breach occurs when a fraudulent party gains access to a computing device or database storing payment account information for one or more payment accounts. The payment account information may be used to complete fraudulent purchases. In one example, the payment account information may be collected from a computing device associated with a single account holder (e.g., a cardholder). In another example, a merchant that stores payment account information for account-on-file transactions may experience a data breach by a fraudulent party to retrieve the payment account information. As used herein, an "account-on-file" transaction is a transaction in which the merchant retrieves stored payment information for a repeat customer, thereby eliminating the requirement of the customer re-entering his or her payment information for subsequent purchases. In one example, the account-on-file transaction may be a subscription service that periodically charges the customer for the service. In another example, the account-on-file transaction may be a transaction initiated via a merchant website by a customer having a stored profile with the merchant. The merchant may also store other information for each cardholder, such as contact information, shopping behavior, and the like.

When a data breach is detected (e.g., a merchant detects unauthorized access to the payment information or a fraudulent purchase is identified), the compromised party transmits breach data to the ADB database for each potentially compromised payment account. The ADB database enables other parties (e.g., other merchants and banks) to access the breach data to prevent or otherwise limit fraudulent activity as a result of the data breach. In one embodiment, the breached or compromised party transmits the breach data to the ADB database directly. In other embodiments, the breach data is sent indirectly to the ADB database. For example, the breach data may be transmitted to the ADB database via the payment processor.

Similar to the LS account data, the breach data includes an account identifier, a reason code, and a timestamp for each potentially compromised payment account. The reasons code may indicate a potential origin of the data breach and/or how the potential breach was detected. The timestamp may indicate an estimated time the breach occurred, when the payment account data breach was detected, and/or when the breach was reported to the ADB database. In other embodiments, the breach data includes additional, fewer, or alternative data elements, including those described elsewhere herein. The breach data may be stored by the ADB database for a predetermined period of time to facilitate storage capacity management.

In the example embodiment, the CI computing device is further in communication with a historical authorization database. The historical authorization database is configured to store historical transaction data of historical transactions. The transaction data may be received from the payment processor and/or other computing devices within the payment network. The transaction data includes data elements retrieved and/or generated for one or more transactions processed by the payment network. The transaction data may include, but is not limited to, an account identifier, a timestamp (e.g., date and time), a merchant identifier, a payment amount, a payment method (e.g., card-not-present, account-on-file, etc.), a location identifier, product(s) purchased, and/or other transaction-related data elements for each transaction associated with the transaction data.

The transaction data is stored in the historical authorization data as a plurality of historical authorization messages. The historical authorization messages are messages formatted based on protocols of the payment network and are used to confirm authorization of a transaction. That is, the transactions associated with the historical authorization messages are transactions that have been previously authorized. In one example, the authorization messages include ISO® 8583 compliant messages and ISO® 20022 compliant messages. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

In at least some embodiments, each historical authorization message is associated with one respective transaction. In other embodiments, the authorization message may be a batch message associated with a plurality of transactions. In the example embodiment, the historical authorization database is configured to be searched, sorted, and/or otherwise organized using the data elements of the historical authorization messages. For example, the historical authorization messages may be filtered to only show transaction associated with a particular merchant or a particular merchant location. In at least some embodiments, the historical authorization messages are stored by the historical authorization database for a predetermined period of time.

In the example embodiment, the CI computing device is configured to provide a CI service to one or more merchants. The CI service facilitates identification of historical transactions that a merchant has authorized that are associated with compromised payment cards and payment accounts. The CI service provides this information to the merchant to enable the merchant to proactively identify potential fraud, inform their customers of the potential compromise, and review or adjust their fraud detection policies.

Merchants register for the CI service using a merchant computing device that is in communication with the CI computing device. In some embodiments, the merchant computing device is directly associated with the merchant. In other embodiments, the merchant computing device is associated with a different party that acts on behalf of the merchant. For example, the merchant computing device may be associated with an acquirer of the merchant (i.e., a financial institution associated with a payment account of the merchant). During registration, the merchants may provide information to the CI computing device to facilitate performing the CI service. In one example, the merchants provide merchant identifiers and/or merchant location identifiers (e.g., a brick-and-mortar store) for the CI service. The merchants opt-in to receive messages from the CI computing device during registration. In the example embodiment, the merchants set a frequency of the messages as described herein. In other embodiments, the merchants may request the messages. In some embodiments, the historical authorization messages are collected and stored by the historical authorization database automatically. In other embodiments, the historical authorization messages are collected and stored by the historical authorization database in response to the merchants registering. In such embodiments, the historical authorization messages may be stored in a different database prior to the merchant registering for the CI service.

In the example embodiment, to perform the CI service, the CI computing device retrieves the historical authorization messages associated with a registered merchant from the historical authorization database. In some embodiments, the CI computing device filters the data stored by the database based on one or more identifiers of the merchant from the registration. In one example, the CI computing device retrieves historical authorization messages that include timestamps within a predetermined period of time (e.g., 90 days). In certain embodiments, the CI computing device extracts data elements of the historical authorization messages rather than retrieve the entire authorization messages. For example, the CI computing device may extract historical account identifiers and timestamps for each historical transaction.

The CI computing device then compares the retrieved historical authorization messages to the LS account data stored within the LSC database and the breach data stored within the ADB database. More specifically, the CI computing device is configured to compare the historical account identifiers of the retrieved historical authorization messages to the account identifiers within the LS account data and the breach data. If one of the historical account identifiers matches an account identifier of the LS account data or the breach data, then the payment account may be potentially compromised. The historical account identifier may have matches in both the LS account data and the breach data because the LSC and the ADB databases are separate from each other. The distributed architecture of the CI system enables the CI computing device to compare account identifiers to both the LSC and ADB databases in parallel, thereby reducing the processing time required to complete the comparison of all historical account identifiers.

When a matching account identifier of the LS account data and/or the breach data is identified for a historical account identifier, the matching account identifier, a reason code associated with the matching account identifier, and a timestamp associated with the matching account identifier are collected by the CI computing device. Each historical account identifier is compared to the data stored by the LSC and ADB databases until every account identifier has been compared. Having separate databases for the LS account data and breach data enables parallel comparison of the historical account identifiers across the distributed databases (i.e., the LSC and ADB databases) over different networks or network channels.

In at least some embodiments, the CI computing device is configured to compare the timestamp associated with the historical account identifier to the timestamp of the matching account identifier to generate a time difference between the historical transaction and the compromise. The time difference facilitates contextual analysis of the transactions. For example, if the transaction occurred prior to the compromise, the payment account or payment card may not have been compromised at the time of the transaction. If the transaction occurred after the compromise, the fraud detection system of the merchant may have incorrectly identified the transaction as non-fraudulent, which may indicate an adjustment of the fraud detection system is recommended.

The CI computing device is configured to generate a compromised account message for the merchant. The compromised account message is a batch file that includes, for example, the matching account identifiers, the respective reason codes, and the respective timestamps identified by the CI computing device. In one embodiment, the CI computing device generates the compromised account message when the first matching account identifier is identified, and data associated with subsequent matching account identifiers are added to the message. In certain embodiments, the compromised account message includes the generated time differences. The compromised account message is transmitted to the registered merchant when the comparison of each historical account identifier is completed to enable the registered merchant to analyze the data stored in the message and act accordingly. In one example, for account-on-file transactions, the merchant may contact a cardholder using stored contact information of the cardholder to notify he or she of the potential fraud associated with his or her payment method. The merchant may request new payment information to replace the potentially compromised account-on-file payment information. In another example, the merchant may adjust the fraud detection system to limit authorization of fraudulent purchases and limit false positives (i.e., non-fraudulent purchases that are incorrectly determined to be fraudulent, thereby preventing authorization of the purchase).

In some embodiments, the CI computing device is configured to analyze the data of the compromised account message to identify at least one trend from the comparison. The trend is one or more similarities between the historical transactions associated with payment cards and/or accounts that have been potentially compromised. For example, the CI computing device may determine there is a trend of lost payment cards that have been used to complete transactions with the merchant. In another example, a trend of compromised accounts associated with a data breach with a particular merchant may be identified.

In at least some embodiments, the CI computing device is configured to generate a report for the data of the compromised account message and update the compromised account message to include the report. The report includes one or more statistical analyses and/or trends that provide the merchant with an overview of the data included within the compromised account message. In some embodiments, the compromised account message may not include the matching account identifiers, reason codes, and timestamps. In such embodiments, the compromised account message includes the report to provide information to the merchant. In one example, the report includes the identified trend(s) and a breakdown of the compromised accounts based on the reason codes and/or the time differences (e.g., five stolen payment cards, four compromises after a transaction with the compromised accounts, etc.). In other embodiments, the report includes a different set of data.

In certain embodiments, the CI computing device is communicatively coupled to a fraud chargeback (FC) database. The FC database is configured to store fraud chargeback data. A fraud chargeback is a transaction that a payment account holder contests as fraudulent, and the burden of the transaction is removed from the account holder, thereby receiving compensation for the transaction, and is shifted to another party, such as the merchant. When a fraud chargeback occurs, the associated merchant collects the fraud chargeback data and transmits the data to the FC database for storage. Similar to the LS account data and the breach data, the fraud chargeback data includes, but is not limited to, an account identifier, a reason code, and a timestamp for each fraud chargeback. In some embodiments, the CI computing device compares the historical authorization messages to the fraud chargeback data stored to identify any matching data elements. If a match is identified, the matching identifier and correspond reason code and timestamp may be added to the compromised account message.

In some embodiments, the fraud chargeback data associated with the registered merchant may be compared to the LS account data stored within the LSC database and the breach data stored within the ADB database. If a matching account identifier is detected, the matching identifier and the corresponding reason code and timestamp may be added to the compromised account message. The CI computing device is configured to generate a chargeback flag associated with the matching account identifier. The chargeback flag indicates that the account identifier is associated with a fraud chargeback and may not be associated with an authorized historical transaction.

After the compromised account message is generated and finalized, the compromised account message is transmitted to the merchant for review and analysis. If no potentially compromised cards or payment accounts are identified during the CI service, the CI computing device notifies the merchant that no potentially compromised accounts are associated with transactions authorized by the merchant. In one embodiment, the CI computing device generates the compromised account message without matching identifiers to indicate no potential compromises and transmits the message to the merchant. After a predefined period of time (e.g., a period of time defined by the merchant during registration), the CI computing device automatically repeats the CI service for the merchant to identify any new potential compromises. In other embodiments, the CI computing device may repeat the CI service in response to a request from the merchant.

In the example embodiment, the CI computing device in communication with the LSC database, the ADB database, the FC database, and/or the historical authorization database via one or more communication networks separate from the payment network. Unlike systems which communicate via the payment network to provide the LS account data, the breach data, and/or the chargeback data, the CI computing device is configured to analyze the different data sets and generate the compromised account message outside of the payment network, thereby reducing the additional bandwidth and processing burden of the payment network. By reducing the bandwidth and processing burden of the payment network, the CI system enables the payment network to operate more efficiently, perform additional tasks, and the like while the registered merchants receive the compromised account message. Moreover, the CI computing device is configured to provide centralized retrieval and analysis of data distributed within various separate databases configured to store different data sets, thereby facilitating a unification of data within a distributed architecture. The CI computing device may be configured to retrieve and process the data from the distributed databases in parallel to reduce the processing time of the CI service.

The methods and systems described herein may be implemented using computer programming or engineering techniques including computer software, firmware, hardware or any combination or subset thereof, wherein the technical effects may be achieved by performing one of the following steps: (i) retrieve a plurality of historical account identifiers from a historical authorization database, each historical account identifier associated with a respective historical transaction of a candidate merchant; (ii) compare the historical account identifiers to LS account data stored by an LSC database; (iii) compare the historical account identifiers to breach data stored by an ADB database separate from the LSC database; (iv) determine whether a first historical account identifier matches an account identifier of the LS account data and/or the breach data; (v) generate a compromised account message when the first historical account identifier is determined to have a first matching account identifier within at least one of the LS account data and the breach data, the compromised account message includes the first matching account identifier and a reason code associated with the first matching account identifier; and (vi) transmit the compromised account message to the candidate merchant.

The systems and methods described herein are configured to facilitate (a) reduced authorizations of potentially fraudulent transactions, thereby increasing the bandwidth, processing speed, and efficiency of computer resources within a payment network configured to process the non-fraudulent transactions; (b) proactive identification of potential fraud; (c) automated unified retrieval and analysis of distributed data across multiple databases having separate functionality, which reduces the amount of requests sent by merchants to the databases, thereby reducing the bandwidth, processing, and efficiency burden on the merchant to retrieve LS account data and breach data; and (d) improved identification of trends associated with compromised cards and payment accounts.

Described herein are computer systems such as a payment processor and a CI computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to provide cardholder information to account-on-file merchants.

FIG. 1 is a schematic diagram illustrating an example compromise identification (CI) system 100 for identifying potential payment card and/or account compromise for a merchant. In the example embodiment, CI system 100 is a computer network system including a merchant computing device 102, a lost and stolen card (LSC) database 104, an account data breach (ADB) database 106, a fraud chargeback (FC) database 108, a CI computing device 110, and a historical authorization database 112 communicatively coupled to a payment processor 114 of a payment network (not shown in FIG. 1). In other embodiments, system 100 includes additional, fewer, or alternative subsystems, including those described elsewhere herein. For example, system 100 may include a plurality of merchant computing devices 102 associated with a plurality of merchants.

In the example embodiment, merchant computing device 102 is associated with a merchant registered for a CI service provided by CI computing device 110. In some embodiments, merchant computing device 102 may be associated with an acquirer of the merchant. Merchant computing device 102 is communicatively coupled to CI computing device 110 to receive and transmit data for the CI service. In particular, the merchant computing device is configured to receive messages from CI computing device 110 identifying any previously authorized transactions associated with the merchant that have potential card or payment account compromise.

Databases 104, 106, 108 are communicatively coupled to CI computing device 110 via separate communication channels and/or networks. The communication channels or networks may be separate from the payment network to facilitate reduced bandwidth and processing burdens associated with the CI service on payment processor 114 and the payment network. Databases 104, 106, 108 are separate from each other to facilitate storage of different data. In at least some embodiments, databases 104, 106, 108 are in communication with one or more merchants, acquirers, issuers, and/or other parties associated with payment accounts and transactions to receive and store data associated with potentially compromised, lost, and/or stolen payment cards and payment accounts. In the example embodiment, LSC database 104 is configured to store LS account data associated with payment cards that have been identified as stolen, lost, or otherwise missing. ADB database 106 is configured to store breach data associated with payment accounts that were potentially involved in an data breach. FC database 108 is configured to store fraud chargeback data associated with payment accounts that have contested a transaction as fraudulent, thereby receiving compensation for the potentially fraudulent transaction.

In the example embodiment, LSC database 104 and ADB database 106 are in communication with one or more issuers to facilitate retrieval of the data stored in databases 104, 106 during authorization of a transaction. FC database 108 is in communication with merchant computing device 102 to receive and/or transmit fraud chargeback data. That is, fraud chargeback data is received from merchants. In other embodiments, databases 104, 106, and/or 108 may be in communication with additional, fewer, or alternative parties to facilitate retrieval, storage, transmittal of the respective data.

CI computing device 110 is communicatively coupled to merchant computing device 102, databases 104, 106, 108, and historical authorization database 112 via one or more communication networks or communication channels separate from the payment network. In some embodiments, CI computing device 110 is communicatively coupled to payment processor 114. In certain embodiments, CI computing device 110 is integrated with one or more of databases 104, 106, 108, historical authorization database 112, and payment processor 114 such that a single computing device or distributed computing system performs the functions of each of the integrated devices as described herein. CI computing device 110 is configured to perform a CI service for one or more merchants as described herein to facilitate identification and analysis of transactions associated with payment accounts and payment cards that are identified as potentially compromised.

Historical authorization database 112 is configured to store historical authorization messages from a plurality of historical transactions. The authorization messages include data elements corresponding to a respective historical transaction, including, but not limited to, a historical account identifier (e.g., a PAN), a transaction timestamp, an account expiry date, a payment amount, a merchant identifier, and/or a cardholder identifier. In the example embodiment, each historical authorization message is associated with a transaction that has been successfully authorized. That is, none of the authorization messages are associated with failed or declined transactions. In other embodiments, the stored historical authorization message may include one or more authorization message associated with failed or declined transactions.

In the example embodiment, the authorization messages are generated and/or collected by payment processor 114. Payment processor 114 is configured to process transactions within a payment network. That is, payment processor 114 is configured to receive, process, and/or transmit transaction data, authorization messages (e.g., ISO® 8583 compliant messages and ISO® 20022 compliant messages), and other transaction-related messages within the payment network. The payment network is configured to facilitate processing transactions (e.g., payment card transactions) by providing particular message protocols to merchants, issuers, acquirers, and payment processor 114 to perform particular functions within the payment network. In the example embodiment, the payment network is a closed network. That is, the payment network is configured to prevent unpermitted access to the messages within the payment network.

At least a portion of the authorization messages processed by payment processor 114 may be stored in database 112. Additionally or alternatively, one or more different computing devices associated with the payment network are communicatively coupled to historical authorization database 112 to provide at least a portion of the authorization messages.

Figure 2:
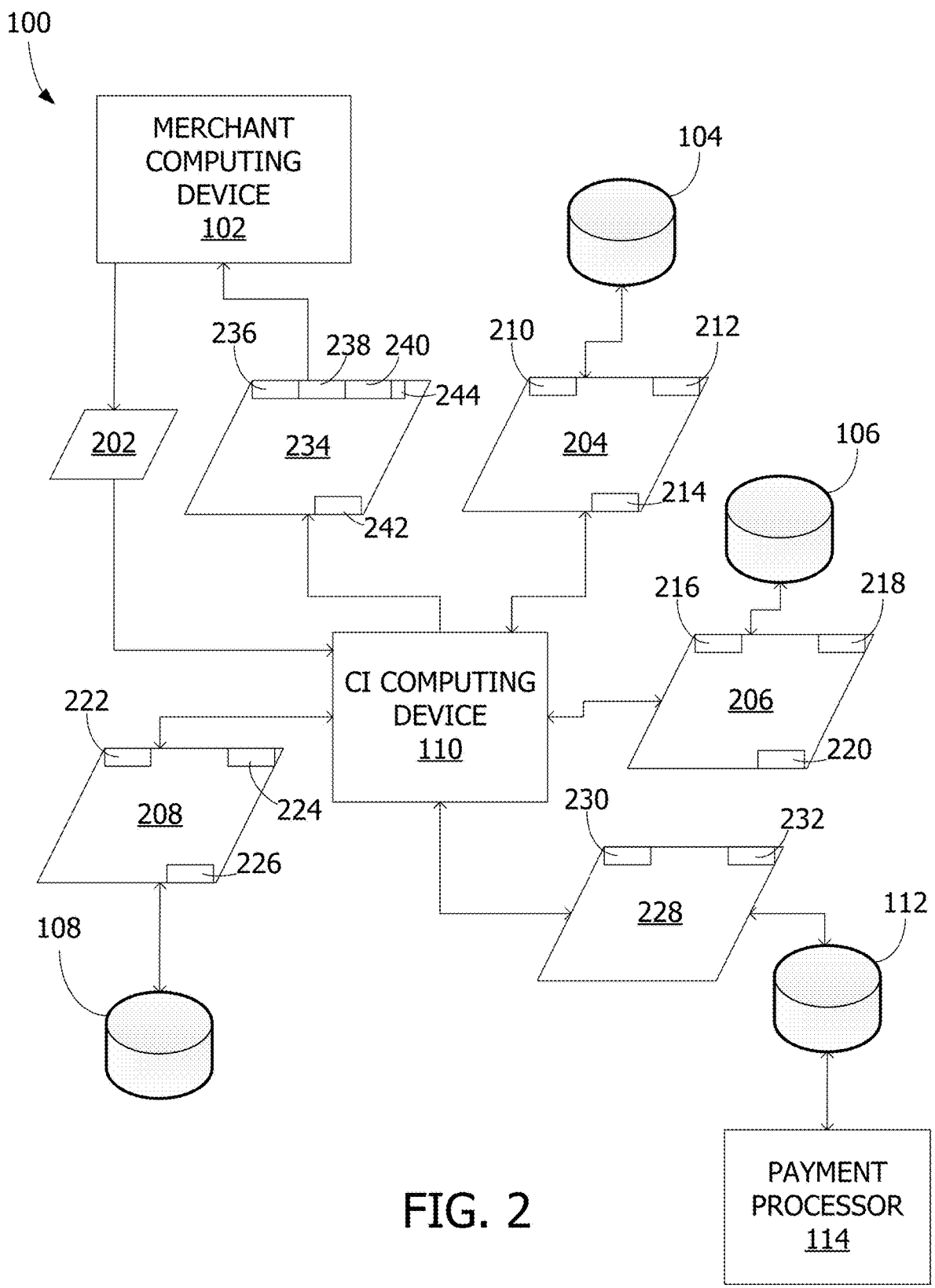

FIG. 2 is an example data flow diagram of system 100 (shown in FIG. 1). In particular, FIG. 2 depicts data flow associated with an example embodiment of the CI service provided by CI computing device 100. In other embodiments, the CI service includes additional, fewer, or alternative data and/or steps, including those described elsewhere herein.

With reference to FIGS. 1 and 2, a merchant (sometimes referred to herein as the "candidate merchant") associated with merchant computing device 102 registers for the CI service. In the example embodiment, during registration, merchant computing device 102 provides a registered merchant identifier 202 to CI computing device 110 for storage. Merchant identifier 202 is used to identify data associated with the merchant. In some embodiments, merchant identifier 202 may be associated with a particular location or store of the merchant. The merchant may specify a frequency of reports or messages provided by CI computing device 110 as described herein. In one example, a default frequency of the messages is one day. In certain embodiments, CI computing device 110 stores a merchant schedule (not shown) that indicates a frequency of messages and a time of the last message for each registered merchant. When the frequency and the time of the last message indicates a new message is to be sent to the candidate merchant, CI computing device 110 is configured to generate a new message as described herein.

CI computing device 110 is configured to compare data stored by historical authorization database 112 to the data stored by LSC database 104, ADB database 106, and/or FC database 108 to identify any historical transactions of the merchant that may be associated with payment accounts that may have experienced or are susceptible to fraud. In the example embodiment, LSC database 104 stores LS account data 204, ADB database 106 stores breach data 206, and FC database stores fraud chargeback data 208. Data 204, 206, 208 includes a plurality of data elements for each entry within databases 104, 106, 108. The data elements may include, but are not limited to, an account identifier (e.g., a PAN), a reason code indicating why the payment account has been identified as potentially compromised, lost, stolen, etc., a compromise timestamp, a potential origin of the compromise, and/or other information associated with the data breach. In the example embodiment, LS account data 204 includes one or more account identifiers 210, and a respective reason code 212 and a timestamp 214 for each account identifier 210. Breach data 206 includes one or more account identifiers 216, and a respective reason code 218 and timestamp 220 for each account identifier 216. Fraud chargeback data 208 includes one or more account identifiers 222, and a respective reason code 224 and timestamp 226 for each account identifier 222. In other embodiments, data 204, 206, and/or 208 includes additional, fewer, or alternative data elements, including those described elsewhere herein. Databases 104, 106, 108 are configured to facilitate navigation and searching of data 204, 206, 208 based on search queries. In at least some embodiments, data 204, 206, 208 is stored in databases 104, 106, 108, respectively, for a predetermined period of time such that data stored beyond the predetermined period of time (e.g., two years) is removed from storage.

LSC database 104 is communicatively coupled to one or more computing devices (not shown) associated with an issuer or a plurality of issuers to receive LS account data 204. In some embodiments, LSC database 104 may be communicatively coupled to payment processor 114 and/or a different computing device to receive LS account data 204. Similarly, ADB database 106 is communicatively coupled to the computing devices associated with the issuers to receive breach data 206. In other embodiments, ADB database 106 is communicatively coupled to merchant computing device 102, payment processor 114, and/or a different computing device to receive breach data 206. For example, if the candidate merchant experiences an payment account data breach, the candidate merchant may report the breach to ADB database 106 by transmitting breach data 206 associated with the data breach to ADB database 106. FC database 108 is communicatively coupled to merchant computing device 102 and/or other computing devices associated with merchants to receive chargeback data 208. In some embodiments, FC database 108 is communicatively coupled to one or more other computing devices (e.g., merchant computing device 102 and/or payment processor 114) to receive chargeback data 208.

To provide the candidate merchant with the messages of the CI service, CI computing device 110 is configured to retrieve historical authorization data 228 associated with the candidate merchant from historical authorization database 112. Historical authorization data 228 is data extracted from authorization messages for historical transactions. In the example embodiment, data 228 is stored in historical authorization database 112 by payment processor 114. Additionally or alternatively, data 228 may be received by one or more different computing devices communicatively coupled to database 112. Historical authorization data 228 includes a historical account identifier 230 (e.g., a PAN) and a timestamp 232 for each historical transaction. In the example embodiment, each historical transaction of historical authorization data 228 has been authorized previously. In other embodiments, at least some transactions of data 228 may be failed or declined transactions. In some embodiments, data 228 includes additional, fewer, or alternative data elements, including those described elsewhere herein.

CI computing device 110 compares data 228 within database 112 with merchant identifier 202 to retrieve data 228 associated with the candidate merchant (or a particular location of the merchant). In the example embodiment, historical authorization data 228 for each historical transaction is stored in historical authorization database 112 for a predetermined period of time (e.g., ninety days). Data 228 older than the predetermined period of time is removed from database 112 to facilitate increased storage space for new authorization data 228 from payment processor 114. In other embodiments, historical authorization data 228 may be stored indefinitely. In such embodiments, CI computing device 110 may be configured to retrieve data 228 from a predetermined period of time by analyzing timestamps 232. Alternatively, historical authorization data 228 may be stored in a different database and is stored within database 112 when the candidate merchant registers for the CI service. In at least some embodiments, historical authorization data 228 within historical authorization database 112 may be periodically or continuously updated to include data from new transactions.

In the example embodiment, CI computing device 110 is configured to retrieve a plurality of historical account identifiers 230 associated with historical transactions of the candidate merchant and the corresponding timestamps 232. CI computing device 110 then compares historical account identifiers 230 to LS account data 204, breach data 206, and/or chargeback data 208. More specifically, CI computing device 110 compares historical account identifiers 230 to account identifiers 210 within LSC database 104, account identifiers 216 within ADB database 106, and/or account identifiers 222 within FC database 108. Each comparison with databases 104, 106, 108 are performed separately and may be performed in parallel or in series. CI computing device 110 then determines whether or not a matching account identifier is detected for each historical account identifier 230 within account identifiers 210, 216, or 222 based on the comparison. If a matching account identifier for a historical account identifier 230 is detected, the matching account identifier is retrieved from the respective database (i.e., database 104, 106, or 108). In addition to the matching account identifier, a reason code and/or a timestamp associated with the matching account identifier may be retrieved. In the example embodiment, one historical account identifier 230 may have more than other matching account identifier. For example, if a matching account identifier is detected in LSC database 104, another matching account identifier may be detected in ADB database 108. In such embodiments, the matching account identifiers are linked together. CI computing device 110 continues to compare historical account identifiers 230 and identifying matching account identifiers until every historical account identifier 230 has been compared.

After every historical account identifier 230 has been compared to LS account data 204, breach data 206, and/or chargeback data 208 and the matching account identifiers, reason codes, and timestamps are retrieved, CI computing device is configured to generate a compromised account message 234. Compromised account message 234 includes one or more matching account identifiers 236, reason codes 238, and timestamps 240. Each matching account identifier 236 has a respective reason code 238 indicating why the account was determined to be potentially compromised or fraudulent and a respective timestamp 240. Compromised account message 234 identifies payment accounts (i.e., matching account identifiers 236) that have completed transactions with the candidate merchant and have been identified as potentially compromised or fraudulent.

In at least some embodiments, CI computing device 110 is configured to analyze the data within compromised account message 234 to identify any trends within the data. For example, CI computing device 110 may determine there is a trend of lost payment cards that have been used to complete transactions with the candidate merchant. In another example, a trend of compromised accounts associated with a data breach of a particular merchant may be identified. CI computing device 110 analyzes reason codes 238 to categorize each matching account identifier 236. CI computing device 110 may be configured to compare timestamps 232 of historical account identifiers 230 to timestamps 240 of matching account identifiers 236 to determine whether or not the historical transactions occurred before or after the payment account was identified as potentially compromised or fraudulent.

CI computing device 110 may generate a report 242 based on the analysis of compromised account message 234. Report 242 includes trends, statistics, and other metrics determined by CI computing device 110. Report 242 provides an overview of the data within message 234. In some embodiments, message 234 may include only report 242.

In certain embodiments, CI computing device 110 may compare chargeback data 208 associated with the candidate merchant to LS account data 204 and breach data 206. That is, chargeback data 208 associated with the candidate merchant is chargeback data 208 associated with transactions of the candidate merchant that were contested as fraudulent. Any matching identifiers 236 from the comparison of chargeback data 208 associated with the candidate merchant may be added to compromised account message 234. CI computing device 110 generates a chargeback flag 244 to include with these matching identifiers to distinguish between the matching identifiers 236.

After compromised account message 234 is generated, CI computing device 110 is configured to transmit message 234 to merchant computing device 102. In some embodiments, if CI computing device 110 does not detect any matching account identifiers 236, compromised account message 234 may be transmitted to merchant computing device 102 to notify the candidate merchant. The candidate merchant analyzes message 234 to review the merchant's fraud detection system and its implementation. For example, if a plurality of transactions using lost payment cards has been authorized by the merchant, the merchant may adjust their fraud detection system to attempt to limit or identify subsequent transactions using lost payment cards.

Figure 3:
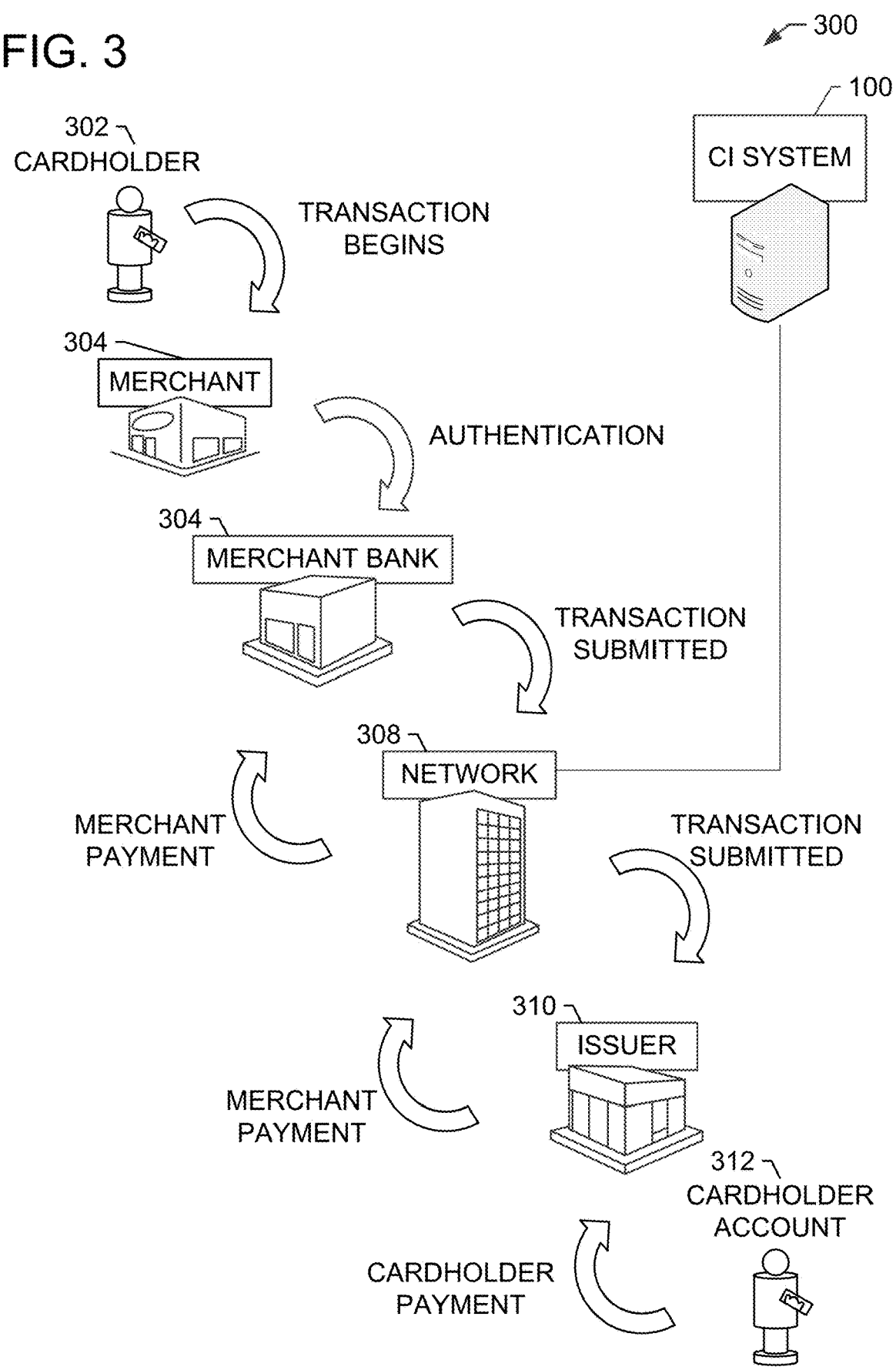

FIG. 3 is a schematic diagram illustrating an example multi-party payment card processing system 300 for processing payment card transactions (including account-on-file transactions). System 300 is communicatively coupled to CI system 100 (shown in FIG. 1) to provide authorization messages to system 100. The present disclosure relates to payment card system 300, such as a credit card payment system using the MasterCard® payment card system payment network 308 (also referred to as an "interchange" or "interchange network"). MasterCard® payment card system payment network 308 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 300, a financial institution such as an issuer 310 issues a payment card for an account, such as a credit card account or a debit card account, to a cardholder 302, who uses the payment card to tender payment for a purchase from a merchant 304. To accept payment with the payment card, merchant 304 must normally establish an account with a financial institution that is part of the financial payment system. This financial institution is usually called the "merchant bank" or the "acquiring bank" or "acquirer bank" or simply "acquirer". When a cardholder 302 tenders payment for a purchase with a payment card (also known as a financial transaction card), merchant 304 requests authorization from acquirer 306 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 306. Alternatively, acquirer 306 may authorize a third party to perform transaction processing on its behalf. In this case, the point-of-interaction terminal will be configured to communicate with the third party. Such a third party is usually called a "merchant processor" or an "acquiring processor."

The payment information received by merchant 304 is stored and transmitted to acquirer 306 and/or payment network 308 as part of an authorization request message. In some embodiments, merchant 304 transmits a plurality of authorization request messages together as a "batch" file to acquirer 306 and/or payment network 308.

Using payment card system payment network 308, the computers of acquirer 306 or the merchant processor will communicate with the computers of issuer 310, to determine whether the cardholder's account 312 is in good standing and whether the purchase is covered by the cardholder's available credit line or account balance. Based on these determinations, the request for authorization will be declined or accepted. If the request is accepted, an authorization code is issued to merchant 304.

In the example embodiment, payment network 308 is configured to transmit the authorization request messages with the payment information to system 100 to facilitate identifying potentially compromised accounts associated with transactions of a candidate merchant. In the example embodiment, payment processor 114 (shown in FIG. 1) is part of payment network 308.

When a request for authorization is accepted, the available credit line or available balance of cardholder's account 312 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 312 is decreased. Normally, a charge is posted immediately to cardholder's account 312. The bankcard association then transmits the approval to the acquiring processor for distribution of goods/services, or information or cash in the case of an ATM.

After a transaction is captured, the transaction is settled between merchant 304, acquirer 306, and issuer 310. Settlement refers to the transfer of financial data or funds between the merchant's account, acquirer 306, and issuer 310 related to the transaction. Usually, transactions are captured and accumulated into a "batch," which is settled as a group.

Figure 4:
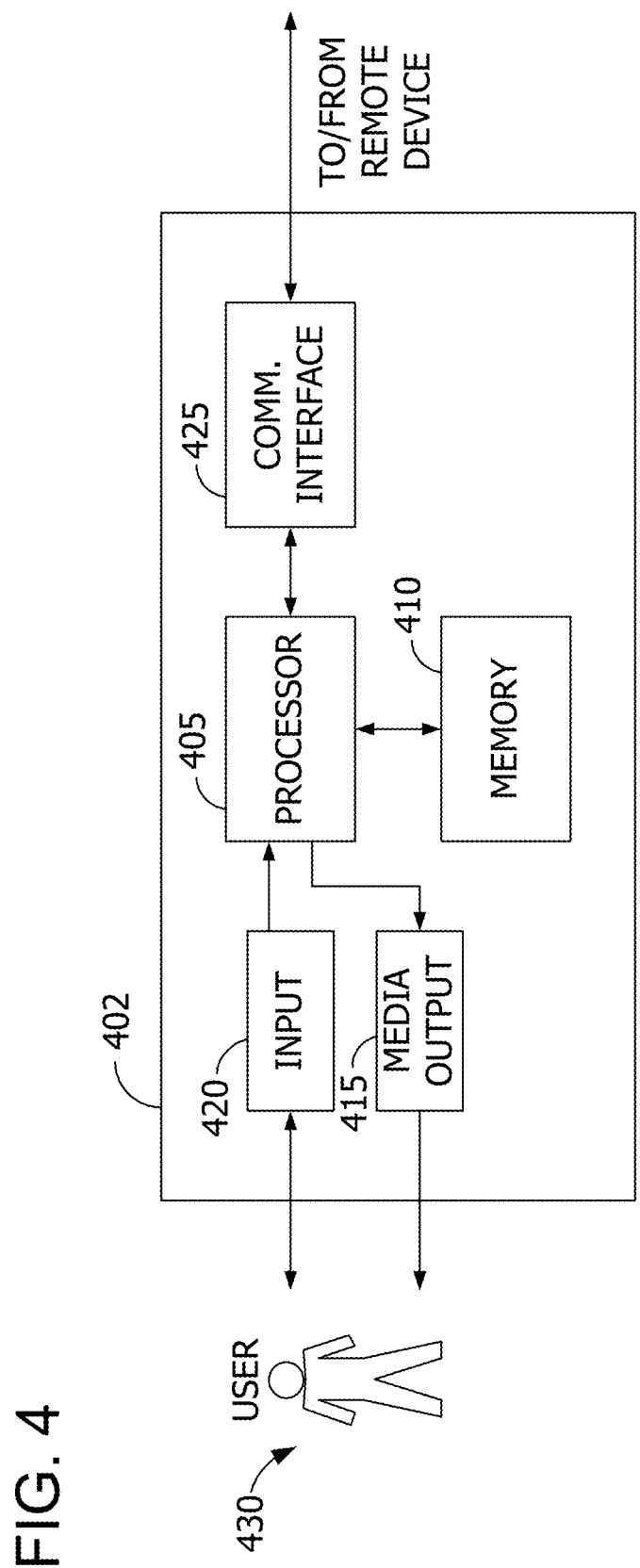

FIG. 4 depicts an exemplary configuration of a remote or user computing device 402, such as merchant computing device 102 and CI computing device 110 (shown in FIG. 1). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 430. Media output component 415 may be any component capable of conveying information to user 430. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 430.

In some embodiments, computing device 402 may include an input device 420 for receiving input from user 430. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and client application. Web browsers enable users 430 to display and interact with media and other information typically embedded on a web page or a website from a web server associated with a merchant. A client application allows users 430 to interact with a server application associated with, for example, a vendor or business. For example, a client application stored on merchant computing device 102 may enable user 430 to interact with CI computing device 110.

Figure 5:
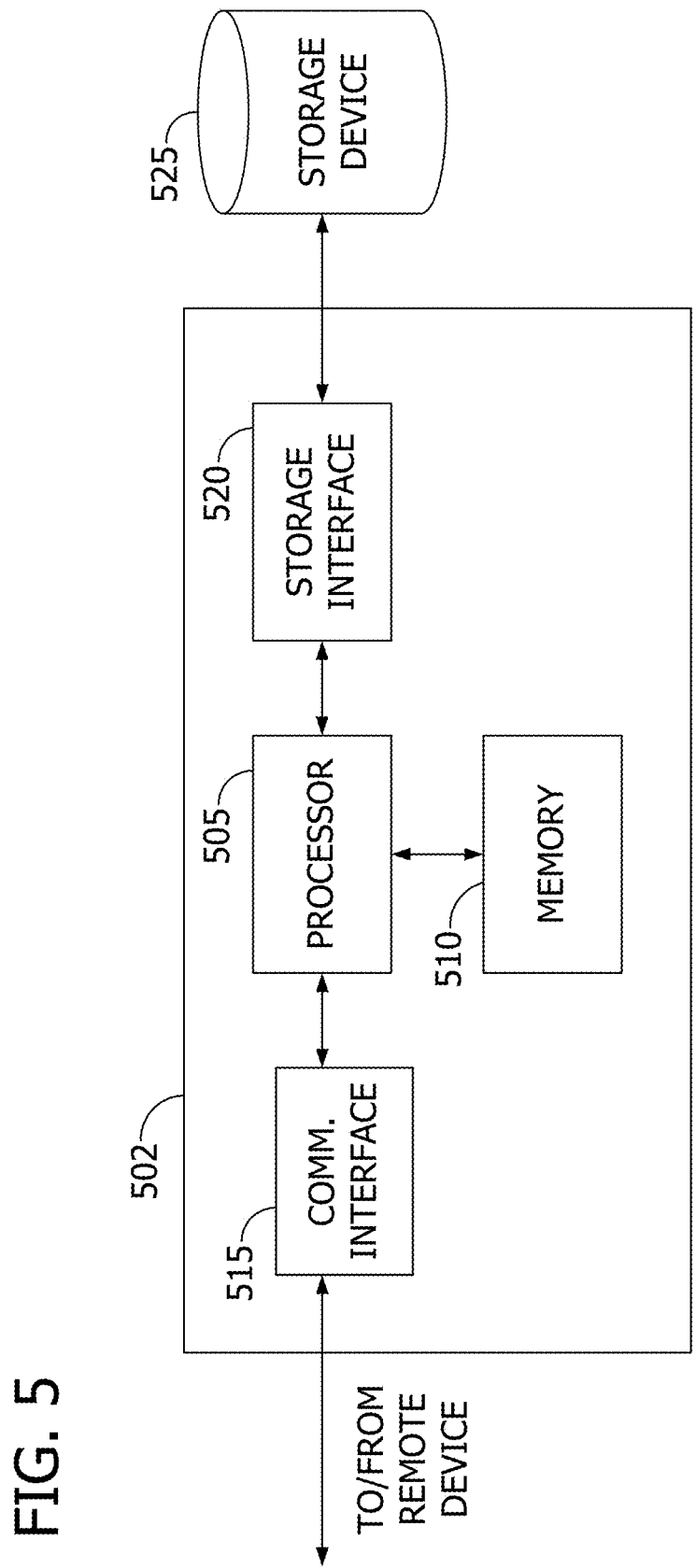

FIG. 5 depicts an exemplary configuration of a host computing device 502, such as merchant computing device 102, CI computing device 110 and payment processor 114 (shown in FIG. 1). Host computing device 502 may include a processor 505 for executing instructions. Instructions may be stored in a memory area 510, for example. Processor 505 may include one or more processing units (e.g., in a multi-core configuration).

Processor 505 may be operatively coupled to a communication interface 515 such that host computing device 502 may be capable of communicating with a remote device such as computing device 402 shown in FIG. 4 or another host computing device 502. For example, communication interface 515 may receive requests from user computing device 402 via the Internet.

Processor 505 may also be operatively coupled to a storage device 525. Storage device 525 may be any computer-operated hardware suitable for storing and/or retrieving data. In some embodiments, storage device 525 may be integrated in host computing device 502. For example, host computing device 502 may include one or more hard disk drives as storage device 525. In other embodiments, storage device 525 may be external to host computing device 502 and may be accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 525.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
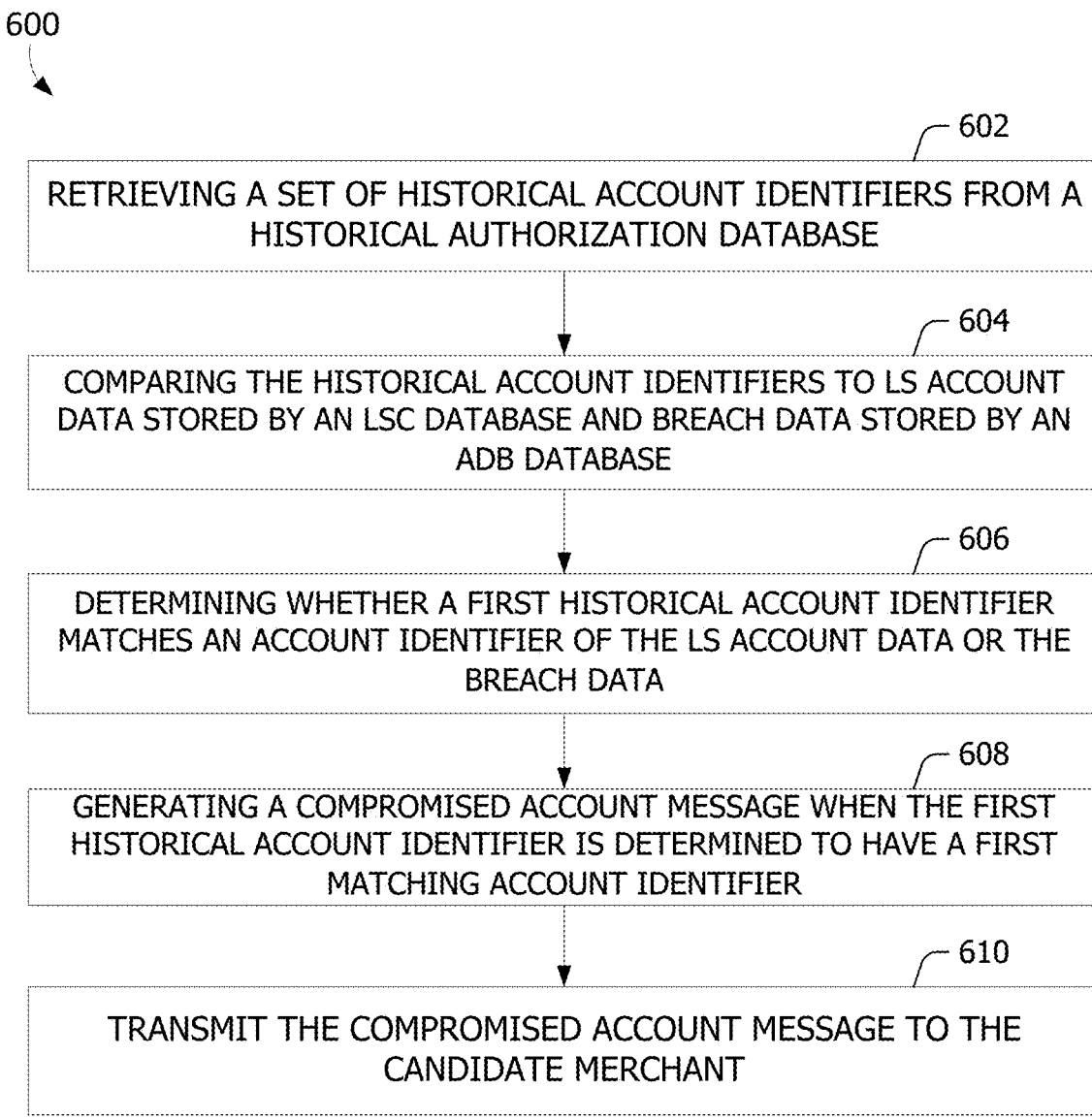

FIG. 6 is a flow diagram of an example method 600 for providing compromised account messages to a candidate merchant using a CI system, such as system 100 (shown in FIG. 1). In the example embodiment, method 600 is performed by a CI computing device. In certain embodiments, method 600 may be at least partially performed by a different computing device. In other embodiments, method 600 may include additional, fewer, or alternative actions, including those described elsewhere herein.

Method 600 begins with the CI computing device retrieving 602 a set of historical account identifiers from a historical authorization database. More specifically, the CI computing device retrieves 602 historical account identifiers associated with historical transactions associated with a candidate merchant registered for the CI service. In at least some embodiments, the CI computing device further retrieves a historical timestamp associated with the historical transaction. The CI computing device compares 604 the historical account identifiers to LS account data stored by an LSC database and breach data stored by an ADB database. In the example embodiment, the CI computing device compares the historical account identifiers to account identifiers of the LS account data and the breach data. The CI computing device determines 606 whether a first historical account identifier matches an account identifier of the LS account data or the breach data based on the comparison.

The CI computing device generates 608 a compromised account message when the first historical account identifier is determined to have one or more matching account identifiers. In at least some embodiments, the CI computing device retrieves the matching account identifier and data associated with the matching account identifier (e.g., a reason code and a timestamp) from the corresponding database. The matching account identifier and the associated data is added to the compromised account message. The CI computing device compares 604 and determines 606 for each historical account identifier. Each matching identifier is added to the compromised account message to form a batch file for the candidate merchant. In some embodiments, the CI computing device may analyze the data of the compromised account message to identify any trends and/or generate reports to be included with the compromised account message. The CI computing device then transmits 610 the compromised account message to the candidate merchant for review and analysis.

Figure 7:
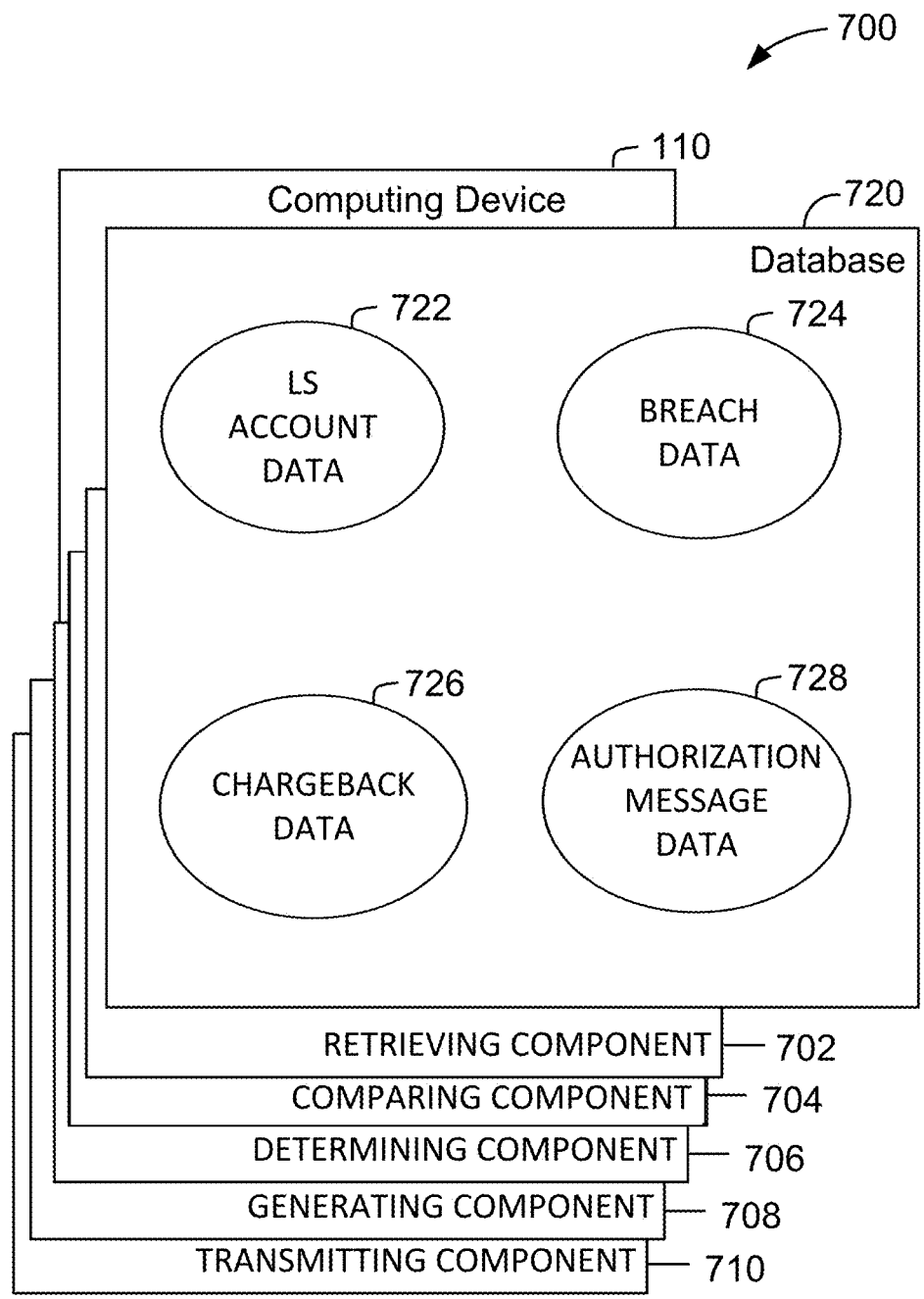

FIG. 7 is a diagram 700 of components of one or more example computing devices that may be used in the method shown in FIG. 6. FIG. 7 further shows a configuration of a distributed database system 720 including at least LSC database 104, ADB database 106, FC database 108 and historical authorization database 112 (shown in FIG. 1). Database system 720 is coupled to several separate components within CI computing device 110 (shown in FIG. 1), which perform specific tasks.

CI computing device 110 includes a retrieving component 702 configured to retrieve a set of historical account identifiers from a historical authorization database. CI computing device 110 further includes a comparing component 704 configured to compare the historical account identifiers to LS account data stored by an LSC database and breach data stored by an ADB database separate from the LSC database. CI computing device 110 also includes a determining component 706 configured to determine whether a first historical account identifier matches one of the account identifiers of the LS account data or the breach data. CI computing device 110 further includes a generating component 708 configured to generate a compromised account message when the first historical account identifier is determined to have a first matching account identifier within at least one of the LS account data and the breach data. CI computing device 110 also includes a transmitting component 710 configured to transmit the compromised account message to the candidate merchant.

In an exemplary embodiment database system 720 is divided into a plurality of sections, including but not limited to, an LS account data section 722, a breach data section 724, a chargeback data section 726, and an authorization message data section 728. These sections are separated between databases 104, 106, 108, 112 (e.g., LS account data section 722 is stored in LSC database 104). Databases 104, 106, 108, 112 are interconnected through CI computing device 110 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/ or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A distributed computer network system comprising:
   a historical authorization database communicatively coupled to a payment network and configured to store a plurality of historical account identifiers associated with historical transactions;
   a lost and stolen card (LSC) database communicatively coupled to a plurality of issuer computing devices and configured to store lost and stolen (LS) account data including at least one LS account identifier and a respective reason code indicating a cause of lost or stolen account for each of the at least one LS account identifiers of the LS account data;
   an account data breach (ADB) database communicatively coupled to a plurality of breach reporting computing devices and configured to store breach data including at least one breached account identifier and a respective reason code indicating a cause of data breach for each of the at least one breached account identifiers of the breach data, the breach reporting computing devices including at least one of (i) computing devices of the payment network, (ii) the issuer computing devices, and (iii) a plurality of merchant computing devices; and
   a compromise identification (CI) computing device comprising a processor and a memory in communication with the processor, the processor in communication with the historical authorization database, the LSC database, and the breach database and programmed to:
   retrieve a set of historical account identifiers associated with a candidate merchant from the historical authorization database, each account identifier of the set of historical account identifiers associated with a respective historical transaction of the candidate merchant;
   compare the set of historical account identifiers to the at least one LS account identifier of the LS account data;
   in parallel with the comparison to the LS account identifiers of the LS account data, compare the set of historical account identifiers to the at least one breach account identifier of the breach data;
   determine that a first historical account identifier of the set of historical account identifiers matches one of the at least one LS account identifiers or the at least one breached account identifiers;
   in response to determining the match, generate a compromised account message that includes the first account identifier and the reason code associated with the matching one of the at least one LS account identifier or the at least one breach account identifier; and
   transmit the compromised account message to the candidate merchant.

2. A distributed computer network system in accordance with claim 1, wherein the processor is further programmed to:
   determine a second historical account identifier of the set of historical account identifiers has a second matching account identifier within at least one of the LS account data and the breach data; and
   add the second matching account identifier and a reason code associated with the second matching account identifier to the compromised account message.

3. A distributed computer network system in accordance with claim 1, wherein the historical transactions associated with the set of historical account identifiers occurred within a predetermined period of time.

4. A distributed computer network system in accordance with claim 1 further comprising a fraud chargeback (FC) database configured to store chargeback data including at least one account identifier and a respective reason code indicating a cause of chargeback for each of the at least one account identifiers of the chargeback data, wherein the processor is further programmed to compare the set of historical account identifiers to the chargeback data.

5. A distributed computer network system in accordance with claim 4, wherein the FC database is configured to receive the chargeback data from at least one merchant.

6. A distributed computer network system in accordance with claim 4, wherein the processor is further programmed to
   compare the chargeback data with the LS account data and the breach data;
   identify a second matching account identifier based on the comparison;
   generate a chargeback flag associated with the second matching account identifier; and
   update the compromised account message to include the second matching account identifier, a reason code associated with the second matching account identifier, and the chargeback flag.

7. A distributed computer network system in accordance with claim 1, wherein the historical authorization database is configured to store a timestamp for each historical transaction, wherein the first matching account identifier is associated with a compromise timestamp, wherein the processor is further programmed to:

determine a time difference between the timestamp associated with the first historical account identifier and the compromise timestamp associated with the first matching account identifier; and add the time difference to the compromised account message.

8. A distributed computer network system in accordance with claim 7, wherein the compromised account message includes a plurality of matching account identifiers, a plurality of reason codes, and a plurality of time differences, wherein the processor is further programmed to:

analyze the plurality of matching account identifiers, the plurality of reason codes, and the plurality of time differences;

determine at least one trend associated with the plurality of matching account identifiers, the plurality of reason codes, and the plurality of time differences based on the analysis;

generate a report indicating the determined at least one trend; and update the compromised account message to include the report.

9. A method for providing a compromised account message to a candidate merchant, the method comprising:

retrieving, by a compromise identification (CI) computing device, a set of historical account identifiers associated with a candidate merchant from a historical authorization database communicatively coupled to a payment network and configured to store a plurality of historical account identifiers associated with historical transactions, each account identifier of the set of historical account identifiers associated with a respective historical transaction of the candidate merchant;

comparing the set of historical account identifiers to at least one LS account identifier of lost and stolen (LS) account data stored by a lost and stolen card (LSC) database communicatively coupled to a plurality of issuer computing devices, the LS account data including the at least one LS account identifier and a respective reason code indicating a cause of lost or stolen account for each of the at least one LS account identifiers of the LS account data;

comparing, in parallel with the comparison to the LS account identifiers of the LS account data, the set of historical account identifiers to at least one breach account identifier of breach data stored by an account data breach (ADB) database communicatively coupled to a plurality of breach reporting computing devices, the LS account data including the at least one breached account identifier and a respective reason code indicating a cause of compromise for each of the at least one breached account identifiers of the breach data, the breach reporting computing devices including at least one of (i) computing devices of the payment network, (ii) the issuer computing devices, and (iii) a plurality of merchant computing devices;

determining, by the CI computing device, that a first historical account identifier of the set of historical account identifiers matches one of the at least one LS account identifiers or the at least one breached account identifiers;

generating, by the CI computing device, in response to determining the match, a compromised account message that includes the first account identifier and the reason code associated with the matching one of the at least one LS account identifier or the at least one breach account identifier; and transmitting, by the CI computing device, the compromised account message to the candidate merchant.

10. A method in accordance with claim 9, wherein generating the compromised account message further comprises:

determining a second historical account identifier of the set of historical account identifiers has a second matching account identifier within at least one of the LS account data and the breach data; and adding, by the CI computing device, the second matching account identifier and a reason code associated with the second matching account identifier to the compromised account message.

11. A method in accordance with claim 9, wherein the historical transactions associated with the set of historical account identifiers occurred within a predetermined period of time.

12. A method in accordance with claim 9 further comprising comparing the set of historical account identifiers to at least account identifier of chargeback data stored by a fraud chargeback (FC) database, wherein the chargeback data includes the at least one account identifier and a respective reason code indicating a cause of chargeback for each of the at least one account identifiers of the chargeback data.

13. A method in accordance with claim 12, wherein the FC database is configured to receive the chargeback data from at least one merchant.

14. A method in accordance with claim 12 further comprising:

comparing the chargeback data with the LS account data and the breach data;

identifying a second matching account identifier based on the comparison;

generating, by the CI computing device, a chargeback flag associated with the second matching account identifier; and updating, by the CI computing device, the compromised account message to include the second matching account identifier, a reason code associated with the second matching account identifier, and the chargeback flag.

15. A method in accordance with claim 9, wherein the historical authorization database is configured to store a timestamp for each historical transaction, wherein the first matching account identifier is associated with a compromise timestamp, wherein generating the compromised account message further comprises:

determining a time difference between the timestamp associated with the first historical account identifier and the compromise timestamp associated with the first matching account identifier; and adding the time difference to the compromised account message.

16. A method in accordance with claim 15, wherein the compromised account message includes a plurality of matching account identifiers, a plurality of reason codes, and a plurality of time differences, wherein generating the compromised account message further comprises:

analyzing, by the CI computing device, the plurality of matching account identifiers, the plurality of reason codes, and the plurality of time differences;

determining, by the CI computing device, at least one trend associated with the plurality of matching account identifiers, the plurality of reason codes, and the plurality of time differences based on the analysis;

generating a report indicating the determined at least one trend; and updating the compromised account message to include the report.

17. At least one non-transitory computer-readable storage media having computer-executable instructions embodied thereon, wherein when executed by at least one processor, the computer-executable instructions cause the processor to:

retrieve a set of historical account identifiers associated with a candidate merchant from a historical authorization database communicatively coupled to a payment network and configured to store a plurality of historical account identifiers associated with historical transactions, each account identifier of the set of historical account identifiers associated with a respective historical transaction of the candidate merchant;

compare the set of historical account identifiers to at least one LS account identifier of lost and stolen (LS) account data stored by a lost and stolen card (LSC) database communicatively coupled to a plurality of issuer computing devices, the LS account data including the at least one LS account identifier and a respective reason code indicating a cause of lost or stolen account for each of the at least one LS account identifiers of the LS account data;

compare, in parallel with the comparison to the LS account identifiers of the LS account data, the set of historical account identifiers to at least one breach account identifier of breach data stored by an account data breach (ADB) database communicatively coupled to a plurality of breach reporting computing devices, the LS account data including the at least one breached account identifier and a respective reason code indicating a cause of compromise for each of the at least one breached account identifiers of the breach data, the breach reporting computing devices including at least one of (i) computing devices of the payment network, (ii) the issuer computing devices, and (iii) a plurality of merchant computing devices;

determine that a first historical account identifier of the set of historical account identifiers matches one of the at least one LS account identifiers or the at least one breached account identifiers;

generate, in response to determining the match, a compromised account message that includes the first account identifier and the reason code associated with the matching one of the at least one LS account identifier or the at least one breach account identifier; and transmit the compromised account message to the candidate merchant.

18. A computer-readable storage media in accordance with claim 17, wherein the computer-executable instructions further cause the processor to:

determine a second historical account identifier of the set of historical account identifiers has a second matching account identifier within at least one of the LS account data and the breach data; and add the second matching account identifier and a reason code associated with the second matching account identifier to the compromised account message.

19. A computer-readable storage media in accordance with claim 17, wherein the historical transactions associated with the set of historical account identifiers occurred within a predetermined period of time.

20. A computer-readable storage media in accordance with claim 17, wherein the computer-executable instructions further cause the processor to compare the set of historical account identifiers to at least account identifier of chargeback data stored by a fraud chargeback (FC) database separate from the LSC database and the ADB database, wherein the chargeback data includes the at least one account identifier and a respective reason code indicating a cause of chargeback for each of the at least one account identifiers of the chargeback data.

21. A computer-readable storage media in accordance with claim 20, wherein the computer-executable instructions further cause the processor to:

compare the chargeback data with the LS account data and the breach data;

identify a second matching account identifier based on the comparison;

generate a chargeback flag associated with the second matching account identifier; and update the compromised account message to include the second matching account identifier, a reason code associated with the second matching account identifier, and the chargeback flag.

22. A computer-readable storage media in accordance with claim 17, wherein the historical authorization database is configured to store a timestamp for each historical transaction, wherein the first matching account identifier is associated with a compromise timestamp, wherein the computer-executable instructions further cause the processor to:

determine a time difference between the timestamp associated with the first historical account identifier and the compromise timestamp associated with the first matching account identifier; and add the time difference to the compromised account message.

23. A computer-readable storage media in accordance with claim 22, wherein the compromised account message includes a plurality of matching account identifiers, a plurality of reason codes, and a plurality of time differences, wherein the computer-executable instructions further cause the processor to:

analyze, by the CI computing device, the plurality of matching account identifiers, the plurality of reason codes, and the plurality of time differences;

determine at least one trend associated with the plurality of matching account identifiers, the plurality of reason codes, and the plurality of time differences based on the analysis;

generate a report indicating the determined at least one trend; and update the compromised account message to include the report.

* * * * *